United States Patent
Kabra et al.

(10) Patent No.: US 12,555,574 B2
(45) Date of Patent: Feb. 17, 2026

(54) DYNAMIC VOICE INTERACTION ACTIVATION

(71) Applicant: International Business Machines Corporation, Armonk, NY (US)

(72) Inventors: Namit Kabra, Hyderabad (IN); Vijay Ekambaram, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 17/804,855

(22) Filed: Jun. 1, 2022

(65) Prior Publication Data
US 2023/0395070 A1 Dec. 7, 2023

(51) Int. Cl.
*G10L 15/30* (2013.01)
*G10L 15/06* (2013.01)
*G10L 15/22* (2006.01)

(52) U.S. Cl.
CPC .......... *G10L 15/22* (2013.01); *G10L 15/063* (2013.01); *G10L 15/30* (2013.01); *G10L 2015/225* (2013.01)

(58) Field of Classification Search
CPC ....... G10L 15/22; G10L 15/063; G10L 15/30; G10L 2015/225; G10L 13/00; G06F 3/0481; G06N 20/00
See application file for complete search history.

(56) References Cited

U.S. PATENT DOCUMENTS

| | | | |
|---|---|---|---|
| 7,188,318 B2 | 3/2007 | Spisak | |
| 7,788,100 B2 | 8/2010 | Slotznick | |
| 8,166,135 B2 | 4/2012 | Ganesh | |
| 8,250,485 B2 | 8/2012 | Spisak | |
| 9,323,732 B2 | 4/2016 | Meron | |
| 11,557,292 B1* | 1/2023 | Wang | G10L 15/16 |
| 11,948,562 B1* | 4/2024 | Welbourne | G10L 15/22 |
| 2013/0275875 A1* | 10/2013 | Gruber | G06F 3/167 |
| | | | 715/728 |
| 2016/0170710 A1* | 6/2016 | Kim | G06F 3/013 |
| | | | 704/275 |
| 2017/0160891 A1* | 6/2017 | Chefalas | G06F 3/048 |
| 2019/0043488 A1* | 2/2019 | Bocklet | G10L 15/22 |
| 2020/0065835 A1* | 2/2020 | Manikandan | G06Q 30/0282 |

(Continued)

FOREIGN PATENT DOCUMENTS

CN 114051639 A * 2/2022 ......... G10L 15/1822

OTHER PUBLICATIONS

Ashok et al., "Capti-Speak: A Speech-Enabled Web Screen Reader", W4A '15, May 18-20, 2015, Florence, Italy, 10 pages, <https://dl.acm.org/doi/abs/10.1145/2745555.2746660>.

(Continued)

*Primary Examiner* — Paras D Shah
*Assistant Examiner* — Mulugeta Tuji Dugda
(74) *Attorney, Agent, or Firm* — Gavin Giraud

(57) ABSTRACT

Embodiments of the present invention provide computer-implemented methods, computer program products and computer systems. Embodiments of the present invention can dynamically predict a user need based, at least in part, on context associated with an activity. Embodiments of the present invention can then execute a remedial action that satisfies the predicted user need.

17 Claims, 3 Drawing Sheets

(56) References Cited

U.S. PATENT DOCUMENTS

2020/0365138 A1* 11/2020 Kim ..................... G06F 3/167
2022/0262233 A1* 8/2022 Rodolico ............. G08B 29/188

OTHER PUBLICATIONS

Disclosed Anonymously, "User Specific Intelligent Screen Reader", An IP.com Prior Art Database Technical Disclosure, IP.com No. IPCOM000266036D, IP.com Electronic Publication Date: Jun. 8, 2021, 6 pages, <https://priorart.ip.com/IPCOM/000266036>.
Ramakrishnan et al., "Non-visual Web Browsing: Beyond Web Accessibility", 2017, 13 pages, <https://link.springer.com/chapter/10.1007/978-3-319-58703-5_24>.
Yu et al., "Enhancing Mobile Reading with Automatic Mode Switching on Reading and Listening" Downloaded Mar. 31, 2022, 7 pages, <http://up.csail.mit.edu/other-pubs/uist2011-read4me.pdf>.

* cited by examiner

DYNAMIC VOICE INTERACTION ACTIVATION

BACKGROUND

The present invention relates generally to the field of speech recognition, and more particularly to dynamic activation of a speech recognition system.

Typically, speech recognition technology enables the recognition and translation of spoken language into text by computers with the main benefit of searchability. Some speech recognition systems require "training" where an individual speaker reads text or isolated vocabulary into the system. The system can then analyze the person's specific voice and uses it to fine-tune the recognition of that person's speech for increased accuracy. Applications of speech recognition technology include voice user interfaces such as voice dialing (e.g., "call home"), call routing (e.g., "I would like to make a collect call"), appliance control, speech-to-text processing (e.g., word processors or emails), etc.

SUMMARY

According to an aspect of the present invention, there is provided a computer-implemented method. The computer implemented method comprises: dynamically predicting a user need based, at least in part, on context associated with an activity; and executing a remedial action that satisfies the predicted user need.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that electronic devices typically have voice interaction (i.e., speech recognition) capabilities. For example, most electronic devices can reproduce speech (i.e., audio) of text that is displayed on those respective electronic devices. In some situations, users may have difficulty in reading displayed text (e.g., due to text size, vision, disorientation, brightness, etc.). Embodiments of the present invention recognize this problem and provides solution for speech recognition systems to dynamically activate based, at least in part, on user context analysis. As such, embodiments of the present invention can activate and subsequently produce audio associated with text that is displayed on respective electronic devices in response to determining context of a user interaction with the electronic device as discussed in greater detail later in this Specification.

Figure 1:
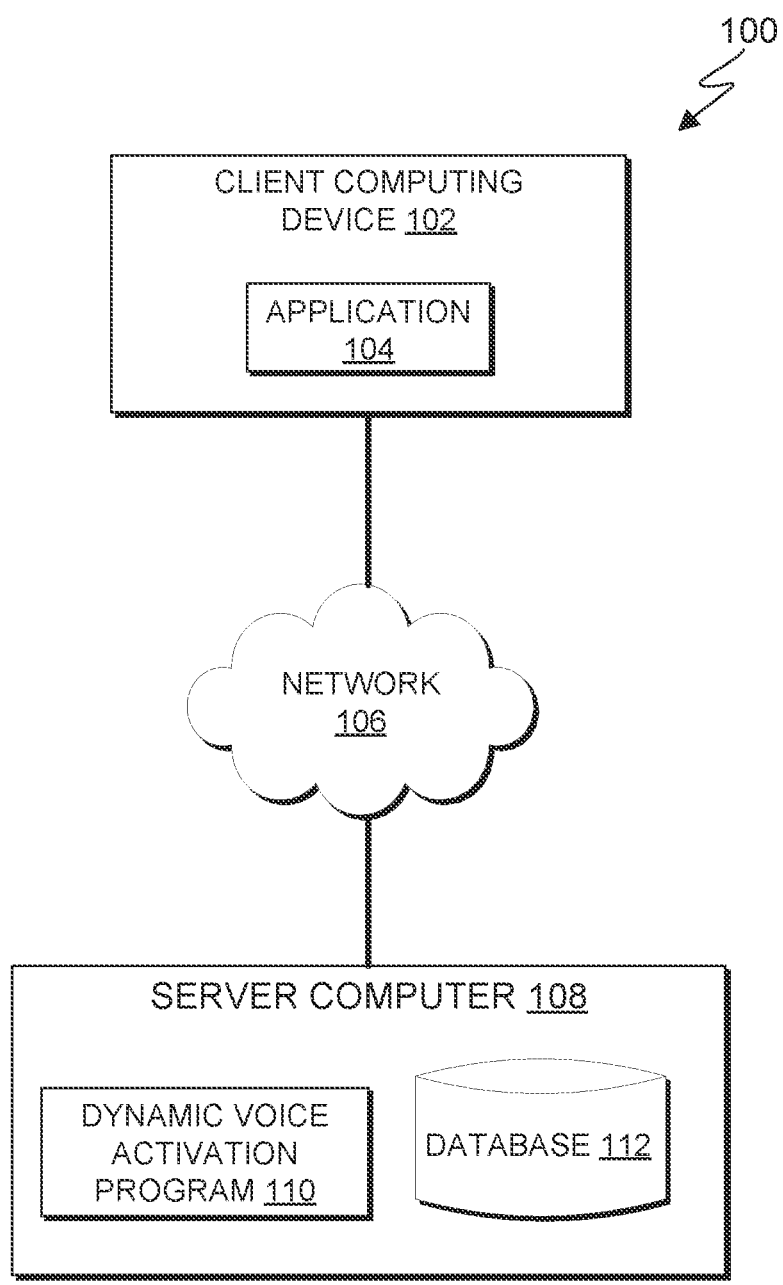
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access dynamic voice activation program 110 (e.g., using TCP/IP) to access user information and database information. Application 104 can further communicate with dynamic voice activation program 110 dynamically activate a voice interaction based, at least in part, on context of an interaction, as discussed in greater detail in FIG. 2.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts dynamic voice activation program 110 and database 112. In this embodiment, dynamic voice activation program 110 resides on server computer 108. In other embodiments, dynamic voice activation program 110 can have an instance of the program (not shown) stored locally on client computer device 102. In other embodiments, dynamic voice activation program 110 can be a standalone program or system that can be integrated in one or more computing devices having a display screen.

Dynamic voice activation program 110 can dynamically activate a voice interaction between a user and an electronic device. In this embodiment, dynamic voice activation program 110 accesses user information with informed user consent. In some embodiments, dynamic voice activation program 110 provides an option for a user to opt-in and opt-out of services provided by dynamic voice activation program 110. In some instances, dynamic activation program 110 can transmit a notification to the user that dynamic voice activation program 110 is collecting or otherwise using user information.

As used herein, "user information" can include one or more user profiles. In this embodiment, a user profile can include device information (e.g., hardware information associated with respective electronic devices, device capabilities, Internet of Things (IoT) connected devices, etc.) and user preferences (e.g., image quality, brightness, display settings, etc.). User information can also include access to user defined rules. For example, a user profile may specify certain scenarios or conditions that may trigger an automatic voice activation interaction. Specifically, a user may create a rule that when the ambient lighting is low (i.e., a dark room), dynamic voice activation program 110 will trigger a voice interaction of the device. User information can also include biometric information of a user (e.g., eye gaze, heart rate, etc.) and location information (e.g., environment information within a certain radius of the user such as a room in a building and adjacent rooms, vehicle, indoor versus outdoor, background noise, etc.). User information can also include GPS data (e.g., cardinal direction, coordinates, velocity, time, time zone, and date).

Dynamic voice activation program 110 can also store and access previously learned objects and context associated with learned objects to better help dynamic voice activation program 110 recognize both activities and context associated with an activity. For example, user information can include object recognition for presence or absence of visual aids (e.g., eyeglasses) of the user and associated context (e.g., absence of eyeglasses is associated with user difficulty in seeing visual content displayed on an electronic device). In some embodiments, dynamic voice activation program 110 can learn varying context for other objects and scenarios. Specifically, in instances when eyeglasses are detected but not worn appropriately, dynamic voice activation program 110 can transmit a notification to the user requesting whether the user would like to initiate a voice interaction protocol to generate audio associated with content being displayed on the user device. Other examples of context can include location-based information and associated triggers. For example, dynamic voice activation program 110 can learn a user preference for triggering voice interaction when the user is moving (i.e., not static or sedentary), when the user is in a vehicle. In other instances, dynamic voice activation program 110 can learn other context associated with movement (e.g., poor road conditions when a user is in a vehicle can trigger dynamic voice activation program 110 to activate).

In other instances, when dynamic voice activation program 110 detects a lack of user engagement (i.e., that a user is not paying attention) can either transmit a notification to the user requesting whether the user would like to initiate a voice interaction protocol or, in instances where the voice interaction protocol has already been activated, terminate the voice interaction protocol based on user preferences. Optionally, dynamic voice activation program 110 can then generate a and subsequently display a graphic that highlights an area associated with content the user was viewing.

In instances where dynamic voice activation program 110 encounters a new activity (e.g., an interaction and associated context not previously stored from a database), dynamic voice activation program 110 can store user information and respectively associated context. In this way, dynamic voice activation program 110 can reference the database to recognize identify activity and context associated with that activity, as discussed in greater detail later in this Specification. In this embodiment, an activity refers to one or more actions being performed by the user, that is, a series of actions that when considered together depict movement and can include activities in each environment such as reading, watching, talking, driving, sitting, etc. In some embodiments, dynamic voice activation program 110 can receive permissioned access from one or more user devices (e.g., smart watch, smart speakers, cameras, smartphones, etc.) to identify activities being performed by the user.

Dynamic voice activation program 110 can then leverage one or more machine learning and artificial intelligence algorithms to predict a user need. In this embodiment, a user need is based off a context of a current activity (i.e., a user's state and environment) being performed by a user as discussed in greater detail later in this Specification. In this embodiment, user need can refer to voice interaction assistance (e.g., initiation or termination). For example, in instances where dynamic voice activation program 110 identifies the activity as reading, dynamic voice activation program 110 can identify a user need as initiating a voice interaction to generate audio that audibly reads content (e.g., text) the user is reading. Conversely, in other instances, a user need may include terminating text to speech functionality when the user is no longer engaged with content.

In some instances, dynamic voice activation program 110 may determine that a user need as being additional assistance in performing an activity and can accordingly initiate a voice interaction that includes one or more generated recommendations. For example, dynamic voice activation program 110 may identify the activity as reading (e.g., via object recognition, gaze detection) and may also detect that a user giving a verbal query (e.g., speech-to-text recognition). Dynamic voice activation program 110 can then generate one or more recommendations, initiate a voice interaction with the user, and convey the generated one or more recommendations.

A user's need may vary depending on the activity being performed. For example, in some instances, dynamic voice activation program 110 can determine a user's need is to select a function (e.g., an input mechanism) on the user's screen. Specifically, the user may be experiencing difficulty in selecting a graphic that, when selected, allows the user to continue viewing the content. In this instance, dynamic voice activation program 110 can initiate a voice interaction confirming the user's intent to select the graphic. Dynamic voice activation program 110 can then subsequently select the graphic to execute the user's command. In another example, dynamic voice interaction activation program 110 may determine that a user ceases an activity before completion. In those instances, dynamic activation program 110 can initiate a voice interaction and prompt the user for further input (e.g., to prompt the user for a query).

A user state references difficulty or ease a user is experiencing while performing an activity. As such, a user's state can be based on several factors such as user visibility (e.g., difficulty in reading), traveling in a vehicle, current road conditions experienced by the vehicle, etc. In this embodiment, dynamic voice activation program 110 can leverage information collected from one or more sensors of respective connected user devices. For example, dynamic voice activation program 110 can access biometric information of a user via smart phone cameras to detect that the user is distracted or otherwise not engaged (e.g., eye gaze detection) with content displayed on the user's device (e.g., the smart phone). Similarly, dynamic voice activation program 110 can access biometric information of a user to detect that the user is having difficulty reading content. For example, dynamic voice activation program 110 can reference baseline biometric information and current biometric information (e.g., eye gaze) to determine the user is squinting. In this example, dynamic voice activation program 110 can then reference a database (e.g., database 112) for known actions (i.e., activities) and context. Continuing this example, dynamic voice activation program 110 can determine that the user has difficulty in performing the activity (e.g., reading). As such, dynamic voice activation program 110 can initiate a voice interaction (e.g., automatically generate audio associated with the text, transmit a prompt to the user requesting confirmation and voice interaction initiation).

Dynamic voice activation program 110 can use a numeric scale to rate a user's difficulty or ease experienced when performing an activity. In this embodiment, the numeric scale uses greater numbers to indicate a user is experiencing greater difficulty in performing an action (i.e., an activity) and lesser numbers indicates lesser difficulty experienced by the user. In this embodiment, dynamic voice activation program 110 uses a threshold of greater than or equal to 50% to indicate that the user is having difficulty in performing the activity (e.g., user has difficulty). Conversely, dynamic voice activation program 110 uses a threshold of less than 50% to indicate the user is performing the identified activity with ease (i.e., does not have trouble in performing the activity). Thus, in instances where dynamic voice activation program 110 predicts that user has a 50% difficulty in performing an action, dynamic voice activation program 110 can initiate a voice interaction. In this other embodiments, dynamic voice activation program 110 can be configured to use any other suitable threshold and scales.

A user's environment can be localized to a radius around the user (e.g., measured from a primary user device such as a smart phone or smart watch). A user's environment can be localized to a room, and adjacent rooms, a vehicle, and include other people in proximity (i.e., within the radius) of the user, etc. In this embodiment, the user's environment is based on a ten-foot radius around a primary device associated with the user. In other embodiments, the user's environment can be configured to be defined by connectivity to a network (e.g., signal strength).

In response to the determining that the generated score that reflects difficulty a user experiences in performing an activity reaching a specified threshold, dynamic voice activation program 110 can generate one or more recommendations (e.g., one or more remedial actions) based on the identified activity. In instances where interaction with content displayed on the user device requires user permission (i.e., input), dynamic voice activation program 110 generate a recommendation to select and subsequently execute the request to perform a selected action (e.g., clicking on a Uniform Resource Locator (URL), pressing a submit button, selecting a check button, etc.). In instances where the user's need is based off of difficulty in performing an activity (e.g., difficulty in reading), dynamic voice interaction program 110 generate a recommendation to initiate a voice interaction. Conversely, dynamic voice activation program 110 can generate a recommendation to terminate text to speech functionality when the user is no longer engaged with content.

In this embodiment, dynamic voice activation program 110 can transmit a request to perform a remedial action based on its' predicted user need and subsequently execute a remedial action automatically by transmitting instructions to respective electronic devices to execute a command. In certain other embodiments, dynamic voice activation program 110 can take automatically take appropriate action without user intervention. Dynamic voice activation program 110 functions iteratively and may, in response to receiving additional information (e.g., a user ceasing activity from being distracted) halt the remedial action. In other embodiments, dynamic voice activation program 110 can transmit a request to halt execution of the remedial action.

Database 112 stores received information and can be representative of one or more databases that give permissioned access to dynamic voice activation program 110 or publicly available databases. For example, database 112 can store received user profiles, user information, user preferences, device information, etc. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
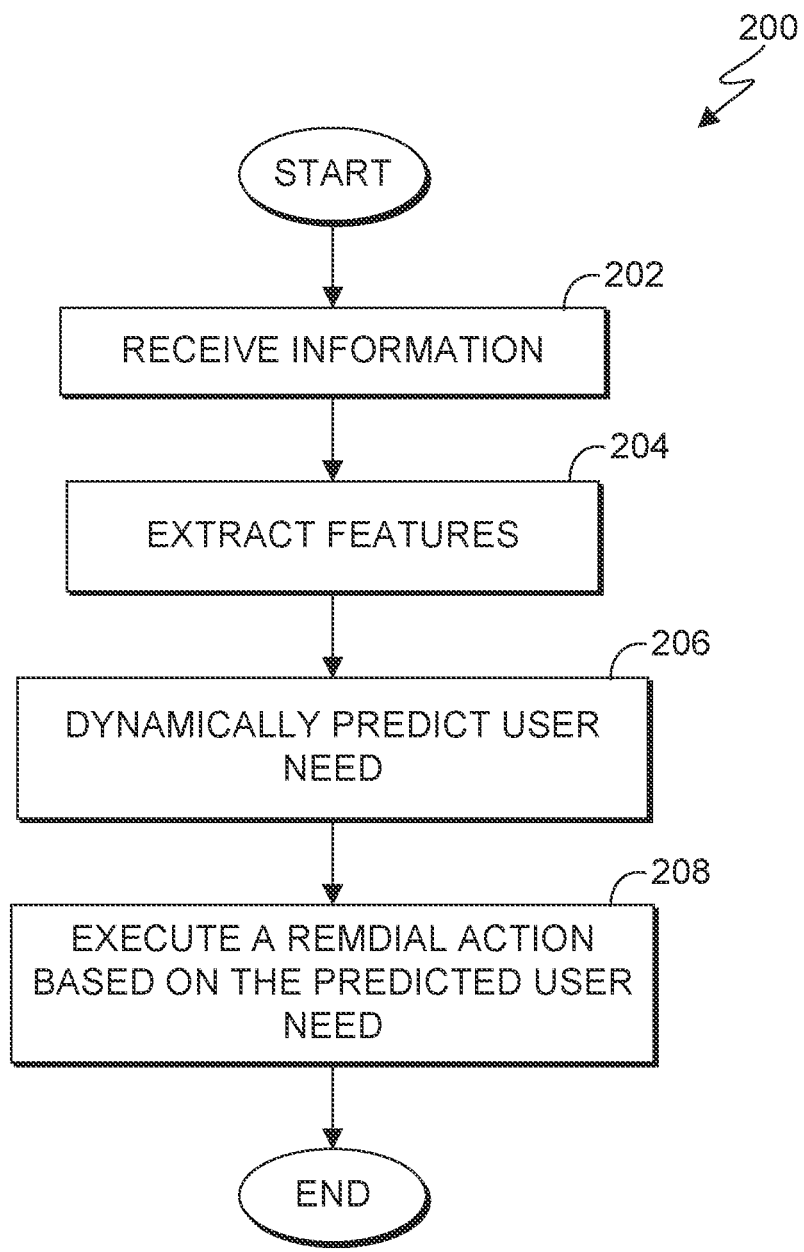
FIG. 2 is a flowchart depicting operational steps for dynamically predicting a user need, in accordance with an embodiment of the present invention.

FIG. 2 is a flowchart 200 depicting operational steps for dynamically predicting a user need, in accordance with an embodiment of the present invention, in accordance with an embodiment of the present invention.

In step 202, dynamic voice activation program 110 receives information. In this embodiment, dynamic voice activation program 110 receives information from one or more databases (e.g., database 112). Information received or otherwise accessed by dynamic voice activation program 110 includes user information. As mentioned above, user information can include one or more user profiles. In this embodiment, a user profile can include device information (e.g., hardware information associated with respective electronic devices, device capabilities, Internet of Things (IoT) connected devices, etc.) and user preferences (e.g., image quality, brightness, display settings, etc.). User information can also include access to user defined rules.

In step 204, dynamic voice activation program 110 extracts one or more features from the received information. In this embodiment, dynamic voice activation program 110 extracts one or more features from the received information by using a combination of machine learning algorithms, speech to text recognition, and natural language processing algorithms. In some embodiments, dynamic voice activation program 110 can classify extracted features as certain objects (e.g., eyeglasses, other electronic devices, furniture, etc.). Dynamic voice activation program 110 can then correlate (i.e., associate) those extracted features to respectively identified environments and location information.

In step 206, dynamic voice activation program 110 predicts user need. In this embodiment, dynamic voice activation program 110 predicts user need by identifying a current activity being performed by the user and context associated with a user activity. In this embodiment, dynamic voice activation program 110 identifies a current activity by leveraging information received from one or more connected device sensors from respectively associated devices. For example, dynamic voice activation program 110 can receive permissioned access from one or more user devices (e.g., smart watch, smart speakers, cameras, smartphones, etc.). Dynamic voice activation program 110 can then leverage one or more machine learning and artificial intelligence algorithms to identify a current activity (e.g., reading, scrolling, walking, running, driving, sitting, etc.).

Dynamic voice activation program 110 can then predict a user need based on context associated with the identified activity. As mentioned above, context refers to the user's state (e.g., difficulty or ease in performing the current activity) and the user's environment. As such, a user's state can be based on a number of factors such as user visibility (e.g., difficulty in reading), traveling in a vehicle, current road conditions experienced by the vehicle, etc. In this embodiment, dynamic voice activation program 110 can assign weighted values to each factor that can affect the user's state. In this manner, dynamic voice activation program 110 can generate a score that reflects the user's predicted difficulty in accomplishing an activity. For example, dynamic voice activation program 110 can access biometric information of a user via smart phone cameras to detect that the user is distracted or otherwise not engaged (e.g., eye gaze detection) with content displayed on the user's device (e.g., the smart phone), identify that the user is sitting down, attempting to read content, and that the user is in a vehicle. Additionally, dynamic voice activation program 110 can detect bumps in the road (e.g., via GPS and acceleration data). In this example, dynamic voice activation program 110 can also identify there are two other users present in the vehicle. Dynamic voice activation program 110 can then assign each of these factors a weighted value (e.g., based on user preferences) and add the values to generate the score that reflects a user's predicted difficulty.

As mentioned above, dynamic voice activation program 110 can use a numeric scale to rate a user's difficulty or ease experienced when performing an activity. In this embodiment, the numeric scale uses greater numbers to indicate a user is experiencing greater difficulty in performing an action (i.e., an activity) and lesser numbers indicates lesser difficulty experienced by the user. In this embodiment, dynamic voice activation program 110 uses a threshold of greater than or equal to 50% to indicate that the user is having difficulty in performing the activity (e.g., user has difficulty). Conversely, dynamic voice activation program 110 uses a threshold of less than 50% to indicate the user is performing the identified activity with ease (i.e., does not have trouble in performing the activity).

In step 208, dynamic voice activation program 110 executes a remedial action based on the predicted user need. In this embodiment, dynamic voice activation program 110 executes a remedial action automatically by transmitting instructions to respective electronic devices to execute a command. In some instances, dynamic voice activation program 110 can transmit a request to a user for confirmation before executing commands. In this embodiment, remedial actions are based off a user's need. In instances where the user's need is based off difficulty in performing an activity (e.g., difficulty in reading), dynamic voice interaction program 110 can initiate a voice interaction to generate audio that audibly reads content (e.g., text) the user is reading. Conversely, in other instances, a user need may include terminating text to speech functionality when the user is no longer engaged with content. As mentioned above, a user's need may vary depending on the activity being performed. For example, in some instances, dynamic voice activation program 110 can determine a user's need is to select a function (e.g., an input mechanism) on the user's screen. Specifically, the user may be experiencing difficulty in selecting a graphic that, when selected, allows the user to continue viewing the content. In this instance, dynamic voice activation program 110 can initiate a voice interaction confirming the user's intent to select the graphic. Dynamic voice activation program 110 can then subsequently select the graphic to execute the user's command. In another example, dynamic voice interaction activation program 110 may determine that a user ceases an activity before completion. In those instances, dynamic activation program 110 can initiate a voice interaction and prompt the user for further input (e.g., to prompt the user for a query). Other examples of remedial actions can include transmitting a request a request to perform a selected action (e.g., clicking on a Uniform Resource Locator (URL), pressing a submit button, selecting a check button, etc.).

Figure 3:
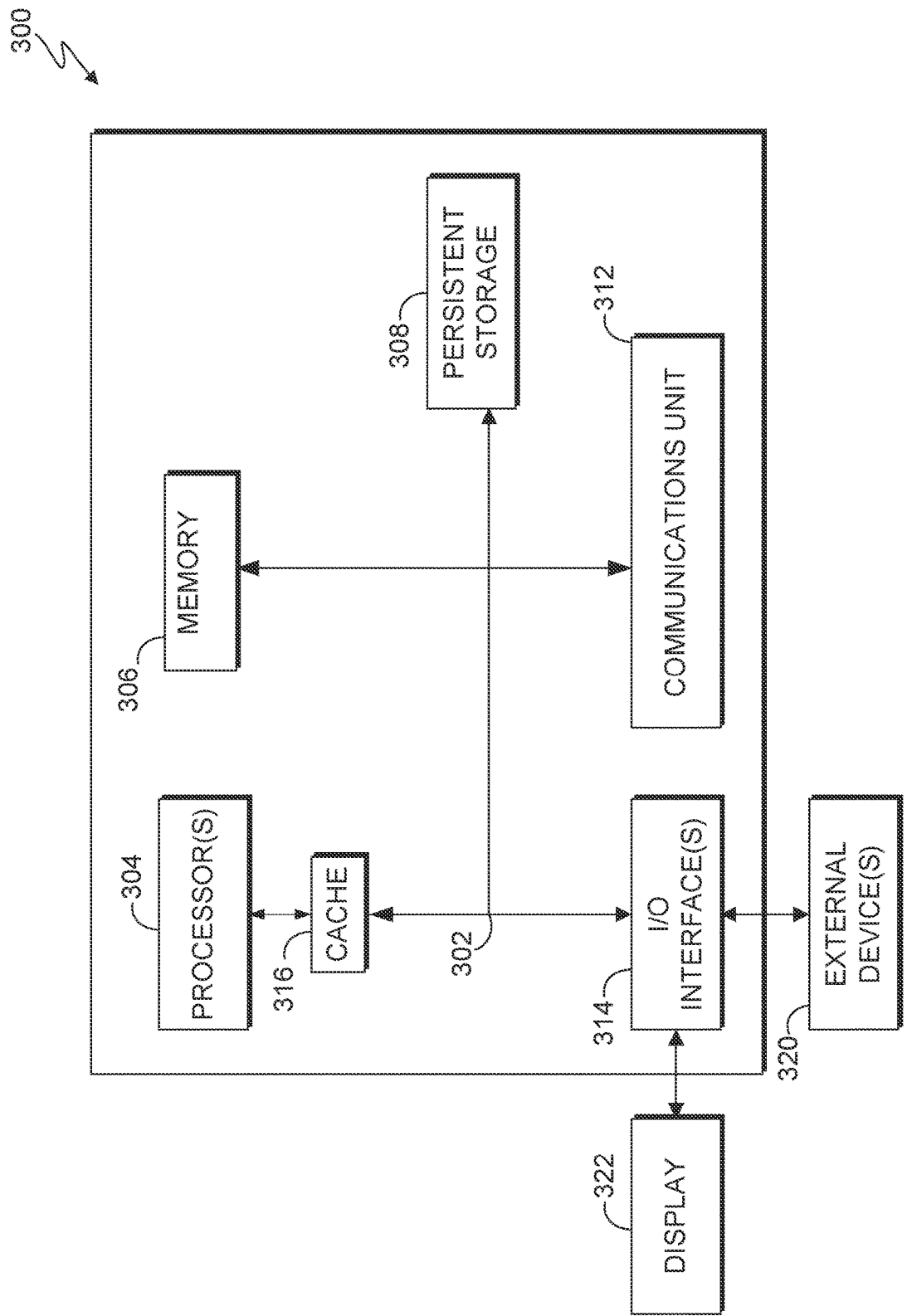
FIG. 3 is a block diagram of an example system, in accordance with an embodiment of the present invention.

FIG. 3 depicts a block diagram of components of computing systems within computing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 300 includes communications fabric 302, which provides communications between cache 316, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Dynamic voice activation program 110 (not shown) may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Dynamic voice activation program 110 may be downloaded to persistent storage 308 through communications unit 312.

I/O interface(s) 314 allows for input and output of data with other devices that may be connected to client computing device and/or server computer. For example, I/O interface 314 may provide a connection to external devices 320 such as a keyboard, keypad, a touch screen, and/or some other suitable input device. External devices 320 can also include portable computer readable storage media such as, for example, thumb drives, portable optical or magnetic disks, and memory cards. Software and data used to practice embodiments of the present invention, e.g., dynamic voice activation program 110, can be stored on such portable computer readable storage media and can be loaded onto persistent storage 308 via I/O interface(s) 314. I/O interface(s) 314 also connect to a display 322.

Display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
dynamically predicting a user need based, at least in part, on context associated with an activity by:
extracting one or more features from data received from one or more connected devices and one or more sensors within a user device currently detecting movement, location, and biometric information of the user by scanning the user and a surrounding of the user;
displaying content on a screen of the user device, wherein the content comprises textual information;
identifying a current activity and a respective location based on the extracted features;
maintaining a user profile comprising device information of the user device and connected devices in the surrounding, user preferences for triggering voice interaction, user-defined trigger scenarios, baseline eye gaze, baseline location, and baseline heart rate;
determining a user's state associated with the identified current activity by comparing the movement, location, and biometric information to the user profile; and
determining that the user need comprises a need to audibly hear the textual information based on the user's state, the current activity, and the one or more features; and
executing a remedial action that comprises generating an audible reading of the textual information from speakers within the user device.

2. The computer-implemented method of claim 1, wherein determining a user's state associated with the identified current activity comprises:
assigning weighted values to each feature of the extracted features; and
generating a score that reflects a user's difficulty in performing the activity by adding the respectively assigned weighted values.

3. The computer-implemented method of claim 2, further comprising:
in response to the generated score reaching a threshold level for user difficulty, generating one or more recommendations for a remedial action.

4. The computer-implemented method of claim 3, wherein a remedial action comprises:
generating audio that represents textual information that is currently displayed on a user device or terminating audio that represents textual information that is currently displayed on a user device.

5. The computer-implemented method of claim 1, wherein features comprise: biometric information, user visibility, GPS data, road conditions, and presence of other users.

6. The computer-implemented method of claim 1, further comprising:
in response to receiving additional information, transmitting a request to halt execution of the remedial action.

7. A computer program product comprising:
one or more computer readable storage media and program instructions stored on the one or more computer readable storage media, the program instructions comprising:
program instructions to dynamically predict a user need based, at least in part, on context associated with an activity by:
extracting one or more features from data received from one or more connected devices and one or more sensors within a user device currently detecting movement, location, and biometric information of the user by scanning the user and a surrounding of the user;
displaying content on a screen of the user device, wherein the content comprises textual information;
identifying a current activity and a respective location based on the extracted features;
maintaining a user profile comprising device information of the user device and connected devices in the surrounding, user preferences for triggering voice interaction, user-defined trigger scenarios, baseline eye gaze, baseline location, and baseline heart rate;
determining a user's state associated with the identified current activity by comparing the movement, location, and biometric information to the user profile; and
determining that the user need comprises a need to audibly hear the textual information based on the user's state, the current activity, and the one or more features; and
program instructions to execute a remedial action that comprises generating an audible reading of the textual information from speakers within the user device.

8. The computer program product of claim 7, wherein the program instructions to determine a user's state associated with the identified current activity comprise:
program instructions to assign weighted values to each feature of the extracted features; and
program instructions to generate a score that reflects a user's difficulty in performing the activity by adding the respectively assigned weighted values.

9. The computer program product of claim 8, wherein the program instructions stored on the one or more computer readable storage media further comprise:
  program instructions to, in response to the generated score reaching a threshold level for user difficulty, generate one or more recommendations for a remedial action.

10. The computer program product of claim 9, wherein a remedial action comprises:
  program instructions to generate audio that represents textual information that is currently displayed on a user device or terminating audio that represents textual information that is currently displayed on a user device.

11. The computer program product of claim 7, wherein features comprise: biometric information, user visibility, GPS data, road conditions, and presence of other users.

12. The computer program product of claim 7, wherein the program instructions stored on the one or more computer readable storage media further comprise:
  program instructions to, in response to receiving additional information, transmit a request to halt execution of the remedial action.

13. A computer system comprising:
  one or more computer processors;
  one or more computer readable storage media; and
  program instructions stored on the one or more computer readable storage media for execution by at least one of the one or more computer processors, the program instructions comprising:
    program instructions to dynamically predict a user need based, at least in part, on context associated with an activity by:
      extracting one or more features from data received from one or more connected devices and one or more sensors within a user device currently detecting movement, location, and biometric information of the user by scanning the user and a surrounding of the user;
      displaying content on a screen of the user device, wherein the content comprises textual information;
      identifying a current activity and a respective location based on the extracted features;
      maintaining a user profile comprising device information of the user device and connected devices in the surrounding, user preferences for triggering voice interaction, user-defined trigger scenarios, baseline eye gaze, baseline location, and baseline heart rate;
      determining a user's state associated with the identified current activity by comparing the movement, location, and biometric information to the user profile; and
      determining that the user need comprises a need to audibly hear the textual information based on the user's state, the current activity, and the one or more features; and
    program instructions to execute a remedial action that comprises generating an audible reading of the textual information from speakers within the user device.

14. The computer system of claim 13, wherein the program instructions to determine a user's state associated with the identified current activity comprise:
  program instructions to assign weighted values to each feature of the extracted features; and
  program instructions to generate a score that reflects a user's difficulty in performing the activity by adding the respectively assigned weighted values.

15. The computer system of claim 14, wherein the program instructions stored on the one or more computer readable storage media further comprise:
  program instructions to, in response to the generated score reaching a threshold level for user difficulty, generate one or more recommendations for a remedial action.

16. The computer system of claim 15, wherein a remedial action comprises:
  program instructions to generate audio that represents textual information that is currently displayed on a user device or terminating audio that represents textual information that is currently displayed on a user device.

17. The computer system of claim 13, wherein features comprise: biometric information, user visibility, GPS data, road conditions, and presence of other users.

* * * * *